(12) United States Patent
Stuecker et al.

(10) Patent No.: US 7,527,671 B1
(45) Date of Patent: May 5, 2009

(54) REGENERABLE PARTICULATE FILTER

(75) Inventors: John N. Stuecker, Albuquerque, NM (US); Joseph Cesarano, III, Albuquerque, NM (US); James E. Miller, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 326 days.

(21) Appl. No.: 11/599,203

(22) Filed: Nov. 14, 2006

Related U.S. Application Data

(60) Provisional application No. 60/736,730, filed on Nov. 15, 2005.

(51) Int. Cl.
*B01D 46/00* (2006.01)
*B01D 39/20* (2006.01)

(52) U.S. Cl. .......... 95/273; 55/523; 55/DIG. 5; 95/283; 264/308; 264/628; 264/DIG. 48

(58) Field of Classification Search ........... 55/523, 55/DIG. 5, 282.2, 282.3; 95/278, 273, 283; 264/112, 113, 308, 628, DIG. 48
See application file for complete search history.

(56) References Cited

U.S. PATENT DOCUMENTS

| | | | |
|---|---|---|---|
| 5,997,795 A * | 12/1999 | Danforth et al. | ............. 264/401 |
| 6,027,326 A | 2/2000 | Cesarano, III et al. | |
| 6,401,795 B1 | 6/2002 | Cesarano, III et al. | |
| 6,540,816 B2 | 4/2003 | Allie et al. | |
| 6,572,682 B2 | 6/2003 | Peter et al. | |
| 6,918,941 B2 * | 7/2005 | Kong | ........................... 55/523 |
| 6,939,489 B2 * | 9/2005 | Moszner et al. | ............... 264/16 |
| 6,942,708 B2 | 9/2005 | Peter et al. | |
| 6,942,830 B2 * | 9/2005 | Mulhaupt et al. | ........... 264/255 |
| 6,993,406 B1 | 1/2006 | Cesarano, III et al. | |
| 7,044,992 B2 | 5/2006 | Frankle et al. | |
| 7,052,532 B1 | 5/2006 | Liu et al. | |
| 7,078,004 B2 | 7/2006 | Voss et al. | |
| 7,326,377 B2 * | 2/2008 | Adams | ....................... 264/40.1 |
| 2002/0113331 A1 * | 8/2002 | Zhang et al. | ............... 264/40.1 |
| 2004/0226620 A1 * | 11/2004 | Therriault et al. | ............ 137/825 |
| 2007/0172588 A1 * | 7/2007 | Therriault et al. | ............ 427/180 |

OTHER PUBLICATIONS

Robocasting Enterprises International website, updated Sep. 30, 2001, http://web.archive.org/web/20010930140927/http://robocasting.net/, 4 pages.*
Internet Archive search results for http://robocasting.net/. Date not available.*
Cesarano III etal., abstract of Robocasting Periodic Lattices For Advanced Filtration presentation, Solid Freeform Fabrication Proceedings, 2001, pp. 561-566, accessed from http://home.att.net/~edgrenda2/sf01/sf01_65.htm.*
Cesarano III, summary of Bridging Prototyping and Manufacturing via Robocasting Fine Particle Pastes, ASM Materials Solutions Conference and Show, Oct. 18, 2004, accessed from http://asm.confex.com/asm/ms2004/techprogram/paper_5304.html.*
Jennifer, A. Lewis, Colloidal Processing of Ceramics, Oct. 2000, Journal of the American Ceramic Society, vol. 83, No. 10, pp. 2341-2359.*
Cesarano III, Miller, Stuecker, Ferrizz & Witze, Revolutionary Systems for Catalytic Combustion and Diesel Catalytic Particulate Traps, Sandia Report Sand 204-6443 Printed Dec. 2004.

* cited by examiner

*Primary Examiner*—Duane Smith
*Assistant Examiner*—Robert A Clemente
(74) *Attorney, Agent, or Firm*—Elmer A. Klavetter

(57) ABSTRACT

A method of making a three-dimensional lattice structure, such as a filter used to remove particulates from a gas stream, where the physical lattice structure is designed utilizing software simulation from pre-defined mass transfer and flow characteristics and the designed lattice structure is fabricated using a free-form fabrication manufacturing technique, where the periodic lattice structure is comprised of individual geometric elements.

18 Claims, 4 Drawing Sheets

A. Uniform pores accessible in all decisions.

B. Cross-section view showing a lattice structure with graded pore sizes.

REGENERABLE PARTICULATE FILTER

RELATED APPLICATIONS

This application claims the benefit of U.S. Provisional Application No. 60/736,730, filed on Nov. 15, 2005.

STATEMENT REGARDING FEDERALLY SPONSORED RESEARCH OR DEVELOPMENT

This invention was developed under Contract DE-AC04-94AL85000 between Sandia Corporation and the U.S Department of Energy. The U.S. Government has certain rights in this invention.

BACKGROUND OF THE INVENTION

This invention relates generally to a method of making a filter for removing particulates and, more specifically, to making a lattice-structure filter for removing particulates that can allow for regeneration.

To address tightening diesel-engine-emissions regulations being adopted in the United States and Europe, attention has focused on basic improvements in the design and performance of filters for treating diesel exhaust gases. In such a filter device, the filter traps particulates from an exhaust and, when the amount of particulate matter accumulated on the filter reaches a predetermined value, in order to burn and remove the particulate matter during a regeneration process, the temperature of the filter is increased to, for example, 600° C. or more. This regeneration temperature can be decreased to as low as approximately 300° C. if a catalyst is utilized.

Additionally, $NO_x$ formation from methane combustion in gas-turbine electric power plants is becoming a significant environmental concern. Uniting these two technical problems is the fact that both be addressed through the use of state-of-the-art, in-line ceramic filters/supports providing an appropriate catalytic function. However, these are extremely demanding applications. An in-line catalyst support or filter in a high velocity, high temperature, and corrosive gaseous stream must have a large surface area to volume ratio; a high permeability for low pressure drop; high strength and/or low thermal expansion; high temperature corrosion resistance; and high trapping efficiency (for filters). Similarly, the catalyst must be very active, as well as thermally and chemically stable over a broad range of thermal and chemical conditions.

Joining all of these attributes in one package is challenging. Cordierite traps have been extensively investigated, including a two-stage diesel particulate trap that uses a primary converter to produce excess $NO_2$ and a secondary trap to capture and "burn" the soot, using the $NO_2$ as the oxidant. However, impurities from fuel and engine oil induce rapid corrosion of the cordierite trap. Failure within a short time period can occur. Manufacturers of large diesel engines, who eventually will warranty these filter systems, must consider all aspects of the long-term performance of any filter and filter material. A catalytic system that directly utilizes air/oxygen for soot combustion, is not deactivated by components of the particulates, and that is stable over years of thermal cycling is elusive. An ideal catalyst would lower the combustion temperature of soot from about 550° C. to at least 300-350° C. (typical of diesel exhaust). The combustion rate must be as great as the trapping rate to maintain constant pressure drop across the filter. Noble metal catalysts have potential, but are becoming ever more expensive, making the costs prohibitive for larger engines. Complex mixed-phase catalysts have shown promise for soot combustion, but the temperatures to maintain a constant pressure drop are too high (370° C.). Also, the best catalysts of this type are molten at the operating temperature, raising questions about migration of the active components and their long-term viability.

Pressure drop is also a concern for diesel particulate trap design and can heavily influence fuel economy. Soot which enters porous cordierite walls during filtration imparts an immediate pressure drop increase from a clean filter (2 KPa or 0.3 psi) to 10.5 KPa (1.5 psi), inducing a soot filter cake to form. The soot filter cake can then increase the backpressure to over 14 KPa (2.0 psi), increasing until regeneration can occur.

A filter system is required that can meet the described performance requirements. The filter system must be designed to have the necessary heat, flow, and mass transfer characteristics and must be capable of being fabricated with desired materials in a desired three-dimensional structure.

DETAILED DESCRIPTION OF THE INVENTION

Figure 1:
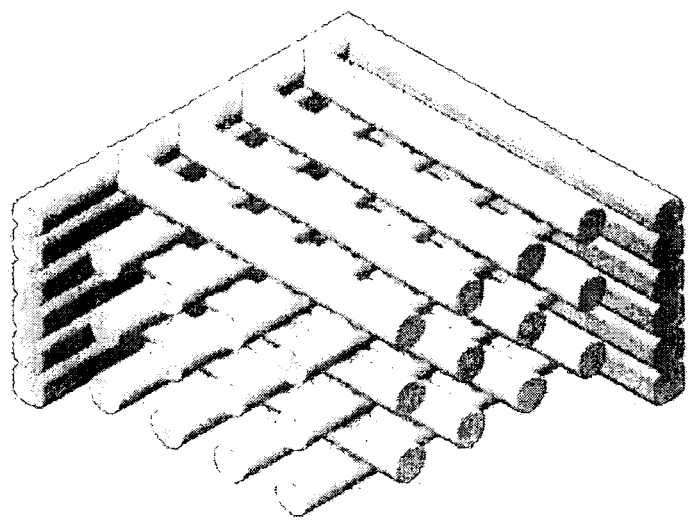
FIG. 1 illustrates embodiments of the three-dimensional lattice structure of the present invention showing both (A) uniform and (B) grade pore-spacing.
Figure 1:
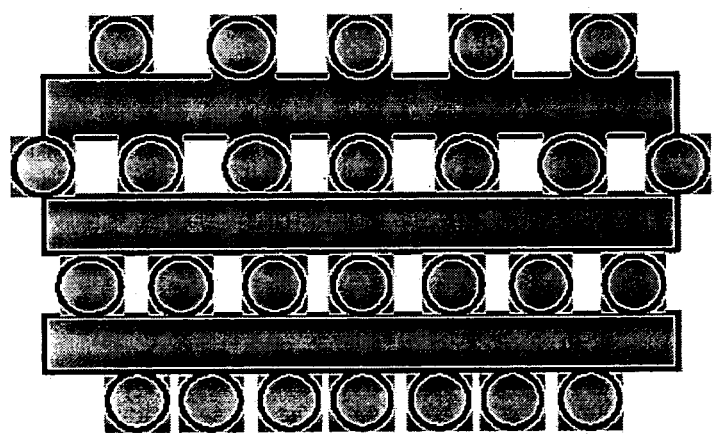

The present invention relates to a porous lattice structure that can be designed and controllably fabricated to meet the necessary heat transfer, mass transfer, and pressure drop characteristics required for a filter for exhaust applications. The various applications for such filters can require that the lattice structure be homogeneous or inhomogeneous, with inhomogeneous structures being required where the properties of the structure must vary to meet design needs. For example, in a diesel particulate trap that must allow regeneration by resistive heating of the materials of the filter, there can be areas where materials of moderate resistance exist, allowing for resistive heating and thus combustion to occur; these selected geometric elements within the filter could also possibly contain a catalyst. Other areas of the three-dimensional lattice structure would be insulating so that no electrical conduction would occur and no heat would be produced; for example, in the outer shell of the filter. A freeform fabrication method, such as the method known as Robocasting (U.S. Pat. Nos. 6,027,326, issued on Oct. 28, 1997; and 6,401,795, issued on Jun. 11, 2002; incorporated herein by reference) could be needed to create these material structures.

Of the performance criteria previously described for a particulate filter, perhaps the most challenging combination to achieve is the fabrication of a structure with a high surface to volume ratio that maintains a high permeability and low pressure drop. Currently, a commonly used filter structure used is an extruded cordierite (ceramic) honeycomb structure. Another used structure comprises ceramic foams. The cordierite honeycomb structure is periodic in two-dimensions; the foam is a non-periodic structure. Despite the successful application of the cordierite honeycomb to automotive catalytic converters, both honeycombs and foams have some fundamental weaknesses that hinder their usefulness in harsh, high-velocity diesel filter and methane combustion environments. For filter applications, half the channels on each end of the honeycomb structures must be plugged so that gas (or a liquid) entering the structure must permeate through pores in the walls to exit the opposite end of the structure. This creates higher pressure drops than are required for optimal performance. At the high flow rates of these applications, foam structures also have unacceptably high pressure drops. Additionally, the ceramic foams are random structures that exhibit variable surface area and pressure drop part-to-part. Cordierite is a material that is optimal for extrusion of thin-walled structures but is very susceptible to high temperature corrosion. The melting temperature of cordierite is >1400° C.; however corrosion products with inorganic impurities can begin to form at temperatures as low as 600° C. Also, for these materials, the strength and resistance to mechanical shock is low.

Inherently different from honeycomb extrudates or ceramic foams, is a designed, porous lattice structure with three-dimensional periodicity in a controllably fabricated structure. These types of structures cannot be manufactured with traditional techniques. Honeycomb structures, although periodic (unlike the non-periodic foam structures), can filter particulates using a size exclusion method wherein the (minimum) characteristic dimension of the honeycomb structure that governs the capability to exclude particles is the "necking" between the pores of the structure. This minimum characteristic dimension is on the order of several microns or less. Conversely, the periodic lattice structures of the present invention have spacings of approximately 50 microns to several millimeters in the geometric elements used to fabricate the pore structure. In the lattice structures of the present invention, size exclusion is not the primary mechanism by which particulates are filtered; the turbulence of the fluid stream through the tortuous pathways, and thus particulate pathways, causes the particulates to impact and adhere to the geometric elements of the structure, thereby preventing the particulates from passing through the structure. The flexibility of using materials of varying properties in these lattice structures also means that the materials can have reactive properties that also inhibit the passage of the particulates.

The structures of the present invention are designed to have layers of precisely spaced geometric elements in a structured periodic lattice, such as alternating crosshatched patterns forming face centered tetragonal stacks of geometric elements (see FIG. 1a). One such freeform fabrication method is the Robocasting freeform layered manufacturing method and inherently ensures that the geometric elements meld together and form a strong bond upon sintering. The sintered lattices have controlled porosity in three dimensions, but no line-of-sight pathways. This macrostructure provides tortuosity and a high surface to volume ratio while maintaining predictable permeability and low-pressure drop. The lattices may be improved further by incorporating graded porosity (see FIG. 1b) and/or porous geometric elements. These novel architectures are the basis of our supports and traps. Note that this fabrication technique is not only more versatile in terms of the shape of the ceramic product, but also allows a broader range of fabrication materials to be used. The geometric elements can be comprised of a range of materials and can incorporate reactive materials into the geometric elements; additionally, the geometric elements can be designed with specific porosity (from essentially 0 to 80% porosity) and mass transfer characteristics in the elements themselves.

Another advantage of utilizing such freeform manufacturing techniques is that a structure can be designed based on defined mass transfer, heat transfer and pressure drop (flow) characteristics. That is, the physical lattice structure can be designed using standard software packages based on such parameters as the macroscopic porosity, permeability, tortuosity, geometry of the overall structure as well as the internal geometry (including the geometry of the individual geometric elements making up the structure), expected range of flow characteristics and the characteristics (composition, particle size) of the flow stream. Additionally, the characteristics of the materials used in the subsequent fabrication can be tailored to meet temperature, strength, electrical resistivity, and both chemical and mechanical stability requirements. Moreover, these techniques allow multiple composite materials to be used and can fabricate the structures with control of the three-dimensional compositional structure necessary to control the three-dimensional properties of the structure, producing inhomogeneous structures when necessary. This capability also allows control of the material porosity as well as the inclusion of catalysts directly into the materials; alternatively catalysts can be put on the surfaces or included in the material internal porosity in post-fabrication steps common in the art.

Figure 2:
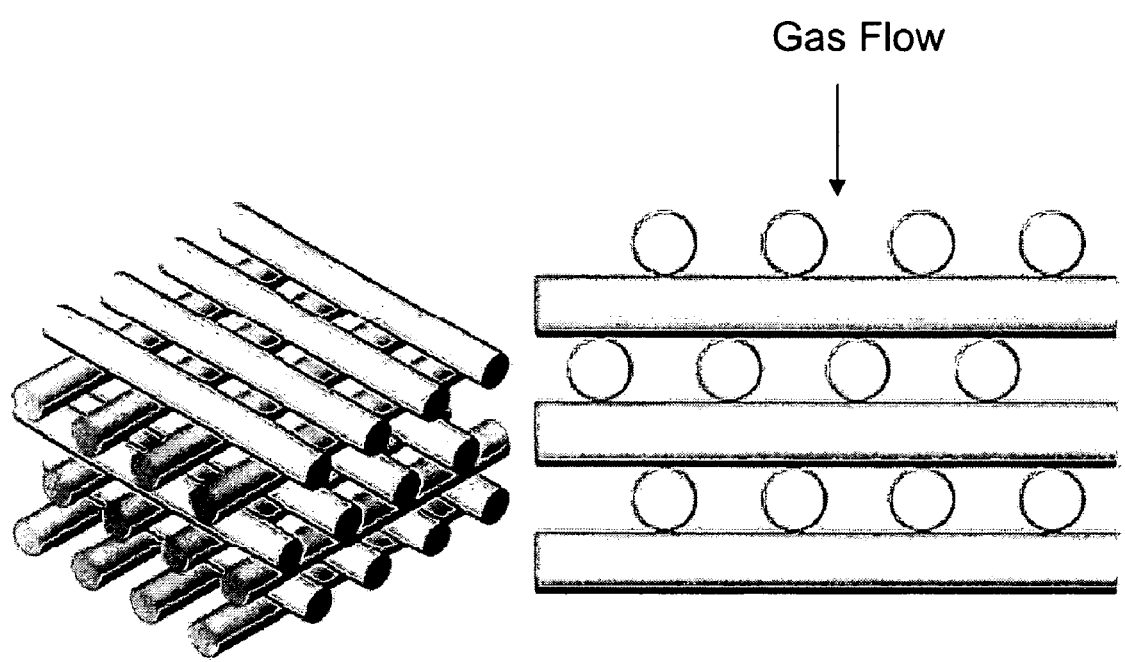
FIG. 2 illustrates two different perspectives of a face-centered-cubic type of lattice structure in which there are no line of sight pathways in the direction of gas flow.

In FIG. 1a, a lattice structure is shown where the pores are uniform and accessible from all sides. FIG. 1b shows a lattice structure where there are graded pore sizes. The Robocasting technique allows flexibility in producing complex and precise structures. The geometric elements used to form the structure (such as the rods in FIG. 1a) can be of pre-defined sizes and spacings. Additionally, the individual geometric elements can be a varied geometry, including the use of any polyhedral geometrical constructs such as cylindrical, rectangular, rhombic, trapezoidal, triangular or variable cross-sectional geometrical elements. The structural configuration used is not limiting as simple structures such as a simple cubic (SC) geometry or a modified FCC geometry can be fabricated, as well as a non-periodic geometry with individual elements. In the Robocasting process, highly concentrated suspensions containing ceramic powder and solvent (water) are deposited, or "written", in a layer-wise fashion. The process is conceptually similar to icing a cake, with two-dimensional layers of "icing" being sequentially deposited, ultimately forming a three-dimensional object. Controlling the viscous behavior of the ceramic suspension to a paste-like consistency enables shape retention of the deposited lines, or geometric elements, of material until drying has taken place. Proper adjustment of the rheological properties of the ceramic paste allows for the creation of self-supporting lattices whose structure is conceptually similar to that of precisely stacked "Lincoln Logs". The placement of these geometric elements can be tailored to obtain either straight-through pathways or more tortuous pathways, depending on design requirements. In one embodiment, a face-centered-tetragonal type of structure (see FIGS. 2a and 2b) can be used in which there are no line of sight pathways in the direction of gas flow. This type of porous structure could enhance mass-transfer rates above those found in traditional straight-channel extruded-honeycomb monoliths with a minimum penalty in pressure drop.

In one embodiment, lattice structures were designed and fabricated for use as a diesel particulate filter. The filter's purpose is to trap soot from an exhaust stream. If the filter is produced that has catalytically active surfaces, the soot can be combusted into carbon dioxide and water when the lattice traps the soot particles. In another embodiment, when the materials used in the filter are designed to have good electrical resistivity characteristics, the filter can be periodically electrically heated to burn off the trapped soot particles to regenerate the trap.

Figure 3:
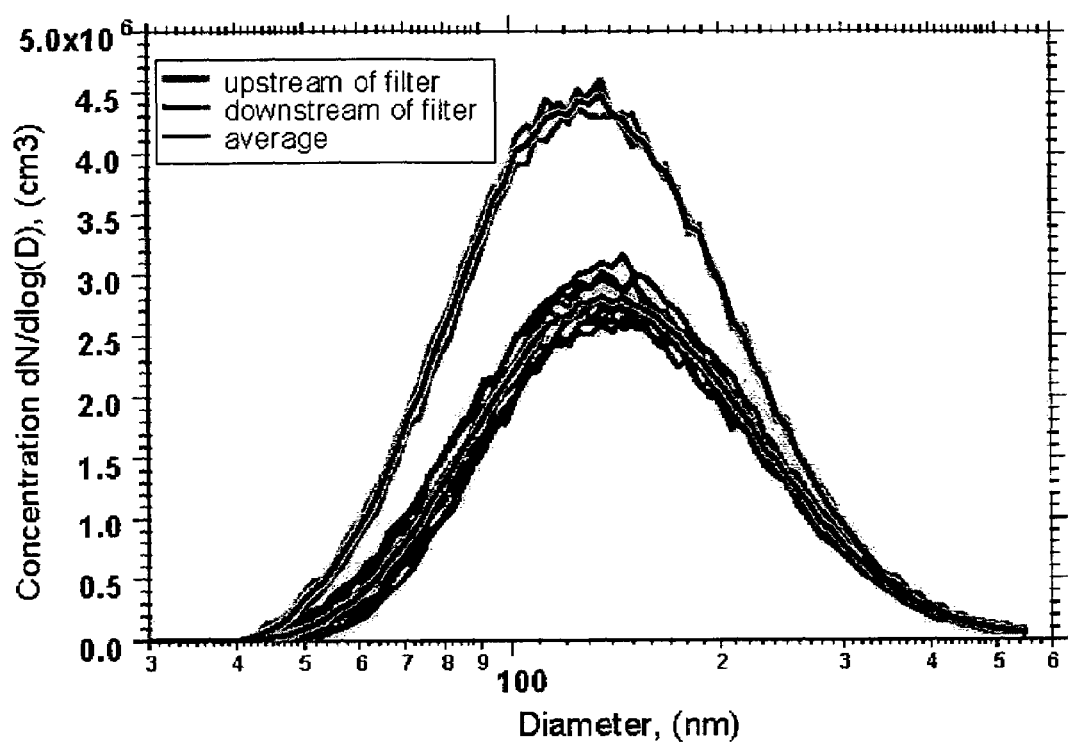
FIG. 3 shows data illustrating one embodiment of the lattice structure of the present invention where soot particles of less than 100 nm in diameter can be trapped.

In one embodiment, filter traps were fabricated utilizing the Robocasting technique by forming alumina into lattice structures with geometric cylindrical elements that were 1.5 mm in diameter. A sample with an overall diameter of 78 mm and 26 mm thick was attached to the exhaust from a 1965 Mercedes diesel engine. Over a five-minute period the lattice was able to trap 27% of the soot. In another diagnostic test, alumina lattices were placed in a stream of soot particles generated with a torch and the concentration and size distribution of the soot particles that passed through the trap were measured with a laser technique. The results shown in FIG. 3 suggest that the lattice can trap some soot particles smaller than 100 nm. All particulate matter trapped by the lattice structure is smaller than the pores of the fabricated lattice structure. Therefore, it is possible to trap small particles with a large-pore structure which has inherently low pressure drop. In this example, the Robocast lattice filter exhibited a pressure drop of 1.4 KPa (0.2 psi).

To show how the capability to design a lattice structure can enhance the flow characteristics compared to a honeycomb cordierite structure, similar honeycomb and Robocast-manufactured three-dimensional lattice structures were fabricated. The two structures had similar dimensions (12.7 mm height by 22 mm outer diameter in an overall cylindrical shape) and the same internal surface area of 167 cm$^2$ (J. Cesarano III, J. E. Miller, J. N. Stuecker, R. M. Ferrizz, and P. O. Witze, "Revolutionary Systems for Catalytic Combustion and Diesel Catalytic Particulate Traps, SAND2004-6443, Sandia National Laboratories technical report, December, 2004; incorporated herein by reference). Methane conversion data was obtained by placing the structures in a methane-containing gas stream in a heated environment. The tests showed that the Robocast lattice structure was stable, both chemically and mechanically, at temperatures up to at least 800° C., achieved greater methane conversions than the comparable honeycomb structure and had a residence time less than that of the honeycomb structure with the bulk porosity of the lattice structure significantly less than the honeycomb structure. Flow velocities along a cross-section of the diameters of both structures were also calculated (using standard flow simulation software). Modeled extruded-honeycomb structures exhibited pressure drops of 6.9 Pa (0.001 psi) and a distribution of flow velocities ranging from 0.0 to 0.005 m/s (0.0-0.016 ft/s). Modeled Robocast-lattice structures exhibited pressure drops of 207 Pa (0.030 psi) and a distribution of flow velocities ranging from 0.0 to 0.042 m/s (0.0-0.138 ft/s). The greater distribution of flow velocities exhibited in the Robocast lattices indicate that the internal structure is creating turbulence that promote mass transfer to the surface. Laminar flow is seen in the extruded honeycomb. The results conclusively show that the Robocast lattices improve mass transfer coefficients while maintaining a low pressure drop.

The capability for fabricating a lattice structure with three-dimensional periodicity and controllable mass transfer and flow characteristics is necessary for producing an efficient diesel particulate filter. However, such a filter must also be able to perform over long time periods and must be regenerable. There are two different strategies for the in-situ regeneration of the lattice structures of the present invention. In one embodiment, a catalyst capable of combusting soot at low temperatures (down to approximately 300° C.) can be incorporated into the lattice structure or onto the surfaces of the lattice structure geometric elements. In another embodiment, an electrically resistive lattice can be fabricated that can be heated to induce soot combustion. Alternatively, both concepts can be incorporated in one lattice structure.

The first approach requires the development of a catalyst that can combust soot at temperatures significantly less than 400° C. (i.e., the temperature of diesel exhaust). A cesium-vanadate material was developed that operates at these lower temperatures to combust soot; however, the presence of vanadium in exhaust streams may not be environmentally desirable. Therefore, a cesium/copper/molybdenum material was developed and shown to combust soot at 330° C. This material can be incorporated into a lattice structure diesel filter to produce regenerative capability.

In the second approach where the lattice structure incorporates materials that are electrically resistive, lattice structures were designed and fabricated that were capable of being electrically heated to at least 600° C. to burn off the soot that accumulates during filter operation. Lattice structures comprising silicon carbide in one embodiment and zirconia/metal composites in another embodiment were successfully developed and electrically heated to temperatures as high as 800° C. without any noticeable oxidation or corrosion. The electrically resistive traps were observed to combust soot when their temperature reached 600° C. Approximately 100 watts of power was required to reach 600° C. and regenerate the trap.

Figure 4:
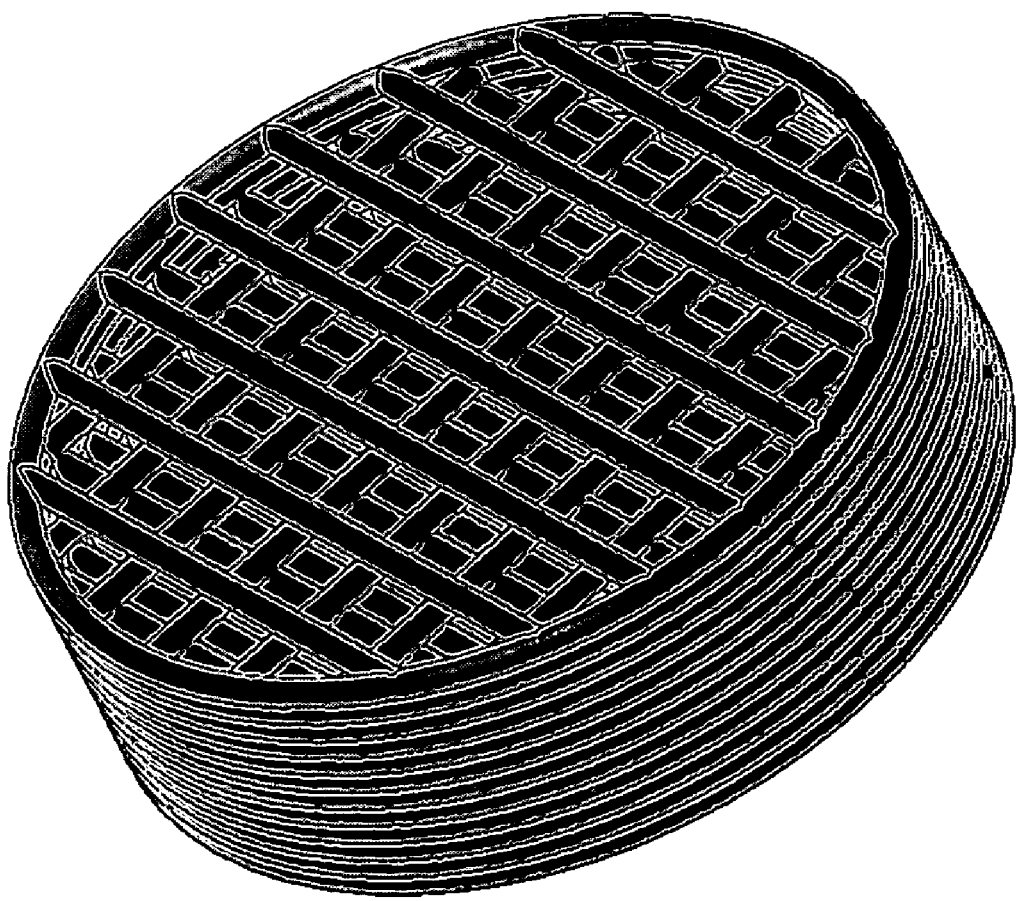
FIG. 4 illustrates a regenerable filter with designed and fabricated compositional variations resulting in areas of more insulating and less insulating material.

In another embodiment, materials were discretely placed in order to create a conductive set of geometric elements. If desired, the wall can include an insulating material. This can be done by adding small amounts of conducting metal to an insulating ceramic (i.e., doping the primary material used to fabricate the geometric elements in the lattice structure). In one embodiment, a Robocast filter can be created from silicon carbide (SiC). Molybdenum disilicide (MoSi$_2$), a conductive co-sinterable system, can be added during the Robocasting process to the section of the SiC filter that is desired to be heated. A non-conductive co-sinterable ceramic such as Si$_3$N$_4$ can be added to the walled section of the filter lattice structure to make the material near insulating in desired and designed areas. FIG. 4 shows a schematic of how a framework of geometric elements of lower resistive value inside an insulating wall can be fabricated using Robocasting to form a regenerable filter. The geometric elements forming the lattice structure are created from a low resistance material while resistivity of the walled section surrounding the lattice structure was increased to an insulating condition. This concept can similarly be used to create a section of geometric elements that are at higher temperatures than other sections of geometric elements, thereby 'tuning' each section to optimally perform a specific task. This regenerable filter is electrically connected to a power source and control means for determining when to regenerate the filter. The power can originate from a variety of sources, including a vehicle's electrical system or can be independent and specifically for the filter. The filter can be designed to substantially remove all the soot necessary to comply with regulatory requirements or can be a pre-filter for a more comprehensive soot removal device, thereby serving to prolong the life of that device. The filter can be designed to have a homogeneous composition or non-homogeneous composition with the composition variation designed to have specific mass transfer, compositional and reactive characteristics or have desired electrical resistivity (and therefore heat transfer) variations. For example, a NO$_x$-oxidizing or reducing section can require temperatures of 275° C., while a soot-oxidation section further downstream in the same monolith can require a temperature of 500° C. Therefore, geometric elements in the NO$_x$-reducing section would be fabricated with a lower resistance value than geometric elements in the soot-oxidation section. Walls of the monolith would be fabricated as near insulating.

EXAMPLE 1

Fabrication of Lattice Filter Using Alumina

Robocast monoliths of dimensions 12.7 mm by 22 mm were prepared from high purity (99.8% $Al_2O_3$) alumina (Alcoa A15, Alcoa World Chemicals, Leetsdale, Pa.) and sintered to >99% density at 1650° C. for high strengths (275 MPa). A range of geometric surface-area-to-volume ratios were produced (15-43 $cm^2/cm^3$) for the robocast lattices by altering both geometric element size and spacing. The geometric surface area of the robocast lattices were designed using a standard CAD software package, SolidWorks (SolidWorks Corporation, Concord, Mass.). Using this software, in one embodiment, surface areas were calculated for CAD models with various geometric element sizes and spacings until a desired surface area of 167 $cm^2$ was obtained. Several combinations of size and spacing matched this target surface area, so a computational-fluid-dynamics software package was used to determine a geometric element size-and-spacing combination that provided the most turbulence without dramatically increasing pressure drop. The flexibility of the Robocasting process enabled a replica of the CAD model to then be fabricated. The final Robocast lattice samples exhibit 45% open porosity with no line-of-sight pathways, with geometric element diameters of 725 μm, and geometric element spacings of 500 μm.

The foregoing description of the embodiments of the system and a method for making the invention have been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be defined by the claims appended hereto.

We claim:

1. A method of removing particulates from an exhaust stream, consisting of:
    designing through software simulation a physical structure of a three-dimensional, porous, periodically-structured filter with defined mass transfer and flow characteristics;
    fabricating said three-dimensional, porous, periodically-structured filter using a free-form fabrication manufacturing technique, said filter comprised of individual geometric elements wherein said lattice structure comprises materials with designed electrical resistivity characteristics wherein said materials comprise defined compositions of at least one material selected from a co-sinterable conductive material and a co-sinterable insulating material; and
    situating said filter such that a fluid flow from an exhaust stream containing particulates passes through said filter.

2. The method of claim 1 wherein said free-form fabrication manufacturing technique is the Robocasting technique.

3. The method of claim 2 wherein said filter is electrically heated to a temperature sufficient to regenerate said filter.

4. The method of claim 1 wherein said filter comprises materials with designed electrical resistivity characteristics.

5. A method of making a lattice filter, comprising:
    designing through software simulation a physical structure of a three-dimensional, porous, periodic lattice structure with defined mass transfer and flow characteristics; and
    fabricating said three-dimensional, porous, periodic lattice structure using a free-form fabrication manufacturing technique, said periodic lattice structure comprised of individual geometric elements, wherein said lattice structure comprises materials with designed electrical resistivity characteristics, wherein said materials comprise defined compositions of at least one material selected from a co-sinterable conductive material and a co-sinterable insulating material.

6. The method of claim 5 wherein said defined mass transfer and flow characteristics are selected from the properties comprising pressure drop, porosity, permeability and tortuosity.

7. The method of claim 5 wherein said periodic lattice structure is comprised of geometric elements with spacings between said geometric elements greater than 50 microns.

8. The method of claim 7 wherein said lattice structure comprises materials with catalytic activity.

9. The method of claim 7 wherein said periodic lattice structure is situated such that a fluid flow from an exhaust stream containing particulates passes through said periodic lattice structure.

10. The method of claim 9 wherein said fluid flow has a pressure drop of less than 1 psi through said periodic structure.

11. The method of claim 5 wherein said periodic lattice structure has no line-of-sight pathways.

12. The method of claim 5 wherein said lattice structure is electrically heated to temperatures sufficient to regenerate said lattice structure.

13. The method of claim 5 wherein said lattice structure comprises materials with catalytic activity.

14. The method of claim 5 wherein said fabricating of said three-dimensional, porous, periodic lattice structure comprises the use of at least two materials of defined compositions to produce a composite material lattice structure.

15. The method of claim 14 wherein said fabricating of said composite material lattice structure comprises varying said compositions in said three-dimensional structure to produce a non-homogeneous composite material lattice structure.

16. The method of claim 5 wherein said lattice structure is comprised of a material selected from the group consisting of alumina, alumina carbide, and ceramic materials.

17. The method of claim 5 wherein said lattice structure is mechanically and chemically stable at temperatures up to 800° C.

18. The method of claim 5 wherein said lattice structure comprises geometric elements that are doped with materials selected from the group consisting of a conductive, co-sinterable material and a non-conductive, co-sinterable material.

* * * * *